(12) United States Patent
Lee et al.

(10) Patent No.: US 12,188,274 B2
(45) Date of Patent: Jan. 7, 2025

(54) DOOR HINGE DEVICE OF VEHICLE

(71) Applicants: HYUNDAI MOTOR COMPANY, Seoul (KR); Kia Corporation, Seoul (KR)

(72) Inventors: Jaeseung Lee, Hwaseong-si (KR); Dae Hee Lee, Incheon (KR); Seung Sik Han, Hwaseong-si (KR); Yonghyun Nam, Anyang-si (KR); Chungsik Yim, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 583 days.

(21) Appl. No.: 17/586,298

(22) Filed: Jan. 27, 2022

(65) Prior Publication Data
US 2022/0412137 A1 Dec. 29, 2022

(30) Foreign Application Priority Data
Jun. 28, 2021 (KR) .................. 10-2021-0084118

(51) Int. Cl.
*E05D 3/02* (2006.01)
*B60J 5/04* (2006.01)
(Continued)

(52) U.S. Cl.
CPC ............ *E05D 3/022* (2013.01); *B60J 5/0479* (2013.01); *E05D 15/581* (2013.01); *E05F 15/56* (2015.01); *B60J 2005/0475* (2013.01); *E05D 3/18* (2013.01); *E05D 15/38* (2013.01); *E05D 15/58* (2013.01); *E05D 2015/586* (2013.01); *E05F 15/60* (2015.01); *E05Y 2201/406* (2013.01);
(Continued)

(58) Field of Classification Search
CPC . E05D 3/022; E05D 15/581; E05D 2015/586; E05D 3/18; E05D 15/58; B60J 5/0479; B60J 2005/0475; E05F 15/56; E05F 15/60; E05Y 2201/406; E05Y 2201/426; E05Y 2201/454; E05Y 2201/684; E05Y 2201/688; E05Y 2800/102; E05Y 2900/531; E05Y 2201/682; E05Y 2800/296; E05Y 2800/30; E05Y 2201/708
USPC ...................................... 296/146.11
See application file for complete search history.

(56) References Cited

U.S. PATENT DOCUMENTS

2006/0249982 A1* 11/2006 Frohne-Brinkmann ..................... B60J 5/0479
296/146.9
2019/0077233 A1* 3/2019 Ma ......................... E05D 15/28

FOREIGN PATENT DOCUMENTS

KR    10-2019-0028966 A    3/2019

* cited by examiner

*Primary Examiner* — Amy R Weisberg
*Assistant Examiner* — Dana D Ivey
(74) *Attorney, Agent, or Firm* — MORGAN, LEWIS & BOCKIUS LLP

(57) ABSTRACT

A door hinge apparatus of a vehicle may include a rail plate provided on one side of a vehicle body corresponding to an end portion of a door of the vehicle and formed with a rail in a width direction of the vehicle, a hinge slide unit including a slide bracket provided on the rail and a door hinge bracket provided on the door where the slide bracket includes a guide slot formed in a diagonal direction of the slide bracket and the slide bracket and the door hinge bracket are pivotally coupled each other through a hinge shaft, and an actuator having a roller configured at a rod to roll along the guide slot so that the slide bracket moves along the rail.

10 Claims, 10 Drawing Sheets

(51) Int. Cl.
_E05D 15/58_ (2006.01)
_E05F 15/56_ (2015.01)
_E05D 3/18_ (2006.01)
_E05D 15/38_ (2006.01)
_E05F 15/60_ (2015.01)

(52) U.S. Cl.
CPC ... _E05Y 2201/426_ (2013.01); _E05Y 2201/454_ (2013.01); _E05Y 2201/682_ (2013.01); _E05Y 2201/684_ (2013.01); _E05Y 2201/688_ (2013.01); _E05Y 2201/708_ (2013.01); _E05Y 2800/102_ (2013.01); _E05Y 2800/296_ (2013.01); _E05Y 2900/531_ (2013.01)

DOOR HINGE DEVICE OF VEHICLE

CROSS-REFERENCE TO RELATED APPLICATION

The present application claims priority to Korean Patent Application No. 10-2021-0084118 filed on Jun. 28, 2021, the entire contents of which is incorporated herein for all purposes by this reference.

BACKGROUND OF THE INVENTION

Field of the Invention

The present invention relates to a door hinge apparatus of a vehicle. More particularly, the present invention relates to a door hinge apparatus of a vehicle without a B-pillar that enables opening and closing operation of a rear door independently from a front door, by displacing the rear door rearward for the opening and closing operation to secure a rotation trajectory of the rear door to avoid interference with the front door.

Description of Related Art

In general, a vehicle door is a door that separates the inside and outside of the vehicle. The vehicle door blocks external noise, rain, dust, wind, etc., and in case of a side surface collision, provides an important function of protecting the occupants by absorbing the impact together with the side structure to safely protect an occupant.

There are various types of vehicle doors, including special-purpose doors, but hinge-type swing doors are most commonly applied to passenger vehicles.

In general, a swing door refers to a door that opens toward the outside of the vehicle body around a hinge shaft provided between the door and the vehicle body through a hinge bracket, and has advantages of easy opening and closing and simple structure providing easy maintenance and repair.

On the other hand, some vehicles are applied with opposite swing doors, which have a large open feeling when the door is opened and is advantageous for occupants to get on or off the vehicle.

These opposite swing doors include a type without a B-pillar and a type with a B-pillar.

FIG. 1 is a side view of a vehicle applied with opposite swing doors according to an example of the related art, and FIG. 2 is a cross-sectional view exemplarily illustrating a portion in which a front door and a rear door meet each other in the vehicle of FIG. 1.

First, referring to FIG. 1 and FIG. 2, an example of opposite swing doors applied to a vehicle 100 without a B-pillar is illustrated. A front door 110 has a hinge shaft provided at the front end portion of the front door 110, and a rear door 120 has a hinge shaft provided at the rear end portion of the rear door 120.

A latch L for maintaining the locked state is provided on one side of the front door 110 or the rear door 120 in the opposite swing doors.

Furthermore, a sealing S for airtightness is provided between the rear end portion of the front door 110 and the front end portion of the rear door 120.

As described above, although the opposite swing doors of the vehicle 100 As described above, the opposite swing doors of the vehicle 100 without a B-pillar has good open feeling when the passengers get on/off or in leisure activities. However, there is a drawback that an opening/closing sequence may be preset such that the front door 110 must first be opened before or closed after opening or closing the rear door 120, due to overlapping interference of rotation trajectories of the front door 110 and the rear door 120 when opening and closing the front door 110 and the rear door 120.

Accordingly, since the opening/closing sequence of the front door 110 and the rear door 120 is preset, there is a problem in that the rear door 120 cannot be opened or closed alone.

FIG. 3 is a side view of a vehicle applied with opposite swing doors according to another example of the related art, and FIG. 4 is a cross-sectional view exemplarily illustrating a portion in which a front door and a rear door meet each other in the vehicle of FIG. 3.

Referring to FIG. 3 and FIG. 4, an example of opposite swing doors applied to a vehicle 200 with a B-pillar 230 is illustrated. In the present case also, a front door 210 has a hinge shaft provided at the front end portion of the front door 2110, and a rear door 220 has a hinge shaft provided at the rear end portion of the rear door 220.

In the present opposite swing doors, a latch L for maintaining a locked state is provided between the B pillar 230 and each side of the front door 210 and the rear door 220.

Furthermore, a sealing S for airtightness is provided between the B-pillar 230 and the rear end portion of the front door 210 and the front end portion of the rear door 220 corresponding to the B-pillar 230.

Accordingly, in the opposite swing doors of the vehicle 200 with a B-pillar, it is advantageous that the front door 210 and the rear door 220 are configured to be independently opened and closed, and thus the operation sequence is not limited. However, the open feeling deteriorates when the passengers get on/off or in leisure activities, due to the application of the B-pillar 230.

Accordingly, depending on the presence or absence of the B-pillar, the opposite swing doors have a difference in open feeling, and a difference in opening and closing operations of the front door and the rear door.

Meanwhile, as described above, to solve the problem of the limited operation sequence of the front door 110 and the rear door 120 while maintaining the open feeling of the vehicle 100 without the B-pillar, there is an example of the related art that employs a gooseneck-type hinge apparatus as a door hinge apparatus of the opposite swing doors. However, such a gooseneck-type hinge apparatus requires a lot of free space in the vehicle body width direction due to the characteristic of its shape such that it is difficult to efficiently configure the vehicle body layout.

Accordingly, to apply the opposite swing doors to a vehicle without a B-pillar, a door hinge apparatus configured for implementing a new opening/closing structure is advantageous.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a door hinge apparatus of a vehicle without a B-pillar that enables opening and closing operation of a rear door independently from a front door by displacing the rear door rearward for the opening and closing operation to secure a rotation trajectory of the rear door to avoid interference with the front door front door.

A door hinge apparatus of a vehicle according to various exemplary embodiments of the present invention includes, a rail plate provided on one side of a vehicle body corresponding to an end portion of a door of the vehicle and formed with a rail in a width direction of the vehicle, a hinge slide unit including a slide bracket provided on the rail and a door hinge bracket provided on the door where the slide bracket includes a guide slot formed in a diagonal direction of the slide bracket and the slide bracket and the door hinge bracket are pivotally coupled each other through a hinge shaft, and an actuator having a roller configured at a rod to roll along the guide slot so that the slide bracket moves along the rail.

The end portion of the door may be a rear end portion of a rear door.

The rail plate may be provided on a side external panel corresponding to the rear end portion of the rear door such that the rail may be disposed from a vehicle front internal side of the vehicle body toward a vehicle rear external side thereof.

The slide bracket of the hinge slide unit may form a space portion having a lower portion opened to accommodate the rod therein, form the guide slot in the diagonal direction at first and second side surfaces of the side bracket, and be configured to move along the rail through a slider. The door hinge bracket of the hinge slide unit may be fixed to the end portion of the door, and connected to an external end portion of the slide bracket through the hinge shaft.

The guide slot may be formed, at both side surfaces of the slide bracket, downwardly in the diagonal direction from a vehicle internal side of the vehicle body toward a vehicle external side thereof.

The rail may be respectively formed at upper and lower portions of the rail plate corresponding to a vehicle external side of the guide slot.

The actuator may be formed as a cylinder-type linear motor provided with a roller at both frontal end portion of the rod.

The actuator may be provided under the rail plate upwardly through a mounting bracket. The rod of the actuator may be disposed inside a space portion. The roller may be in rolling contact with the guide slot on both sides and rotatably connected to the frontal end portion of the rod.

According to various exemplary embodiments of the present invention, in a process of opening of the rear door, the rear end portion of the rear door is pushed toward the vehicle rear external side in advance, to secure the rotation trajectory of the rear door without interference with other component portions, and in the instant state, the opening and closing operation of the rear door alone is enabled.

Therefore, according to various exemplary embodiments of the present invention, in opposite swing doors of a vehicle without a B-pillar, while maintaining the merit of good open feeling when the passengers get on/off or in leisure activities, the door opening and closing sequence is not limited.

Furthermore, a door hinge apparatus of a vehicle according to an exemplary embodiment of the present invention is slimmer than a conventional gooseneck-type hinge device, and also has an advantage in vehicle body layout configuration because it does not require an extra free space for rear door operation.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
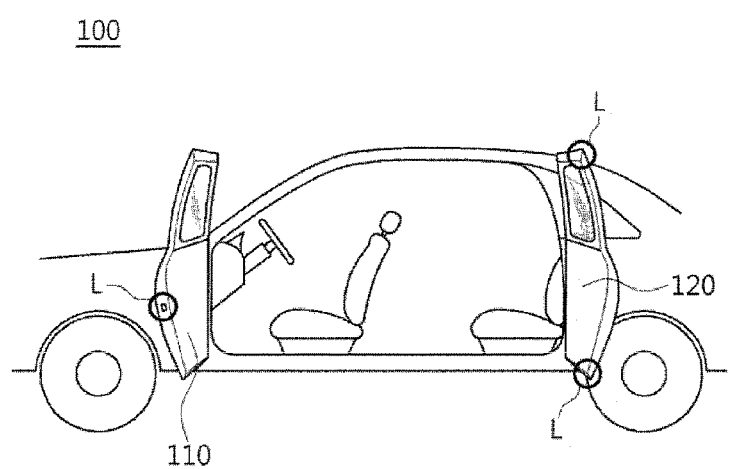
FIG. 1 is a side view of a vehicle applied with opposite swing doors according to an example of the related art.
Figure 2:
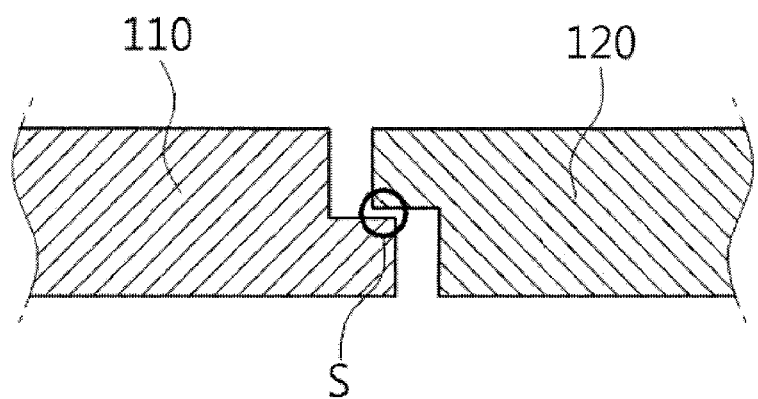
FIG. 2 is a cross-sectional view exemplarily illustrating a portion in which a front door and a rear door meet each other in the vehicle of FIG. 1.
Figure 3:
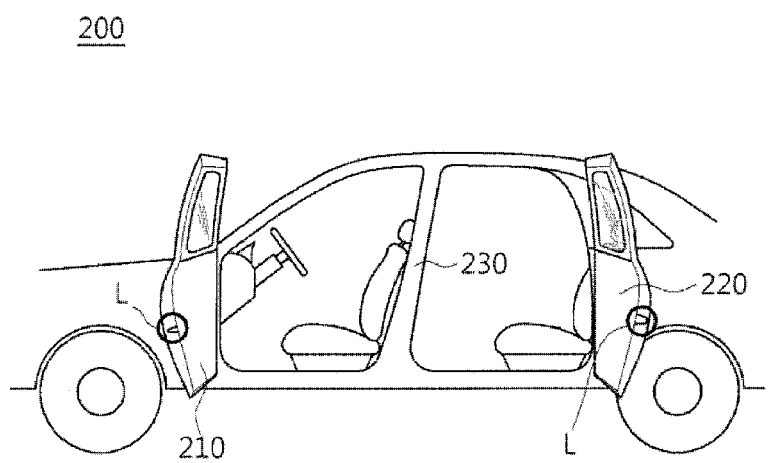
FIG. 3 is a side view of a vehicle applied with opposite swing doors according to another example of the related art.
Figure 4:
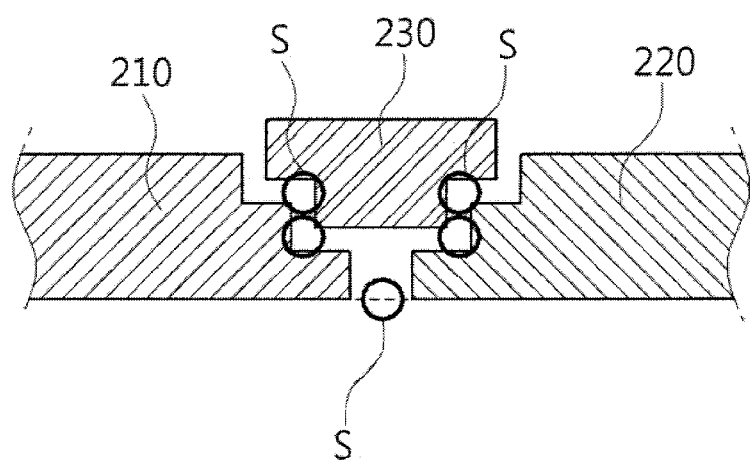
FIG. 4 is a cross-sectional view exemplarily illustrating a portion in which a front door and a rear door meet each other in the vehicle of FIG. 3.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an exemplary embodiment will be described in detail with reference to the accompanying drawings.

The size and thickness of each element are arbitrarily shown in the drawings, but the present invention is not necessarily limited thereto, and in the drawings, the thickness of layers, films, panels, regions, etc., are exaggerated for clarity. Furthermore, the drawings and description are to be regarded as illustrative in nature and not restrictive.

Figure 5:
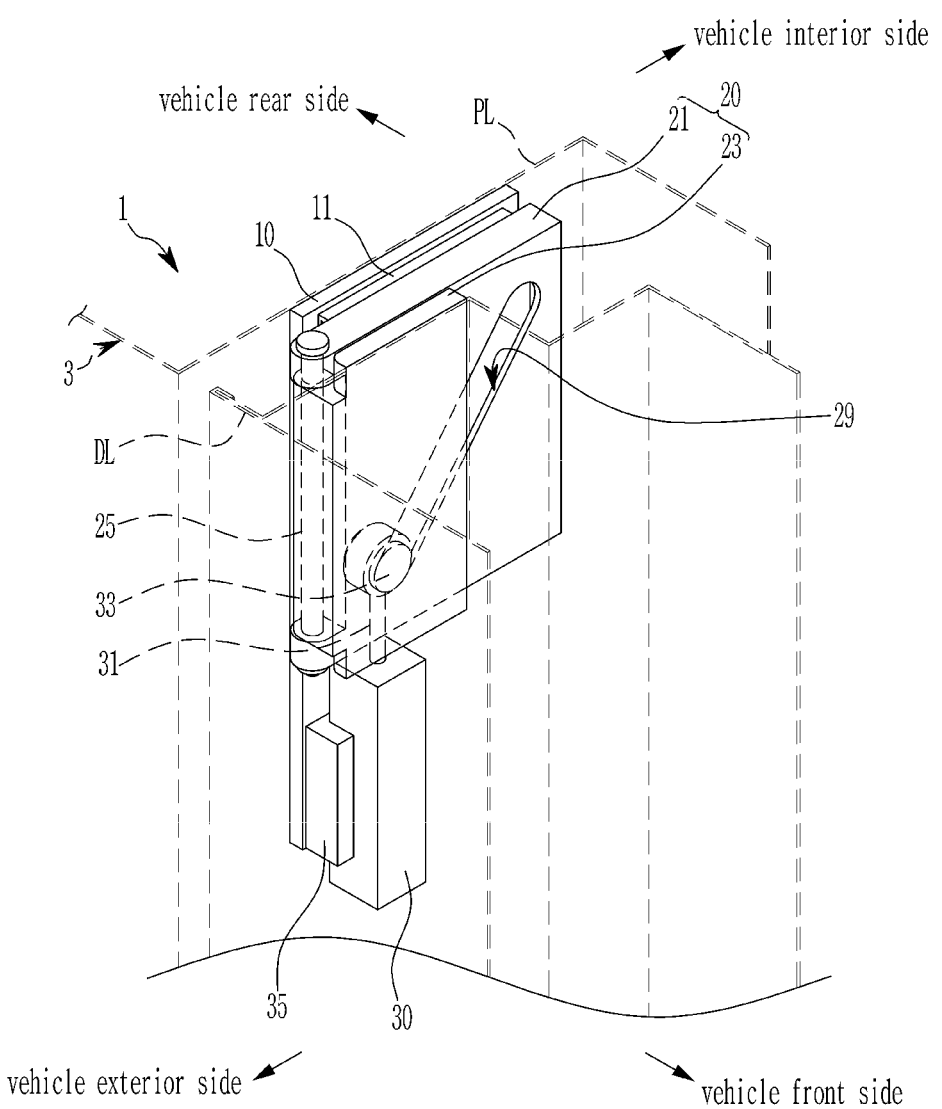
FIG. 5 is a perspective view of a door hinge apparatus of a vehicle according to various exemplary embodiments of the present invention, before operation.

In describing various exemplary embodiments of the present invention, for convenience of the description, a lower left direction in FIG. 5 is referred to as a vehicle external side, an upper right direction in FIG. 5 is referred to as a vehicle internal side, an upper left direction in FIG. 5 is referred to as a vehicle rear side, and a lower right direction in FIG. 5 is referred to as a vehicle front side thereof. Furthermore, a door hinge apparatus of a vehicle according to various exemplary embodiments of the present invention may be provided at both rear doors of driver and passenger sides. For description, the following takes an example of a door hinge apparatus applied to the rear door of the passenger side.

Figure 6:
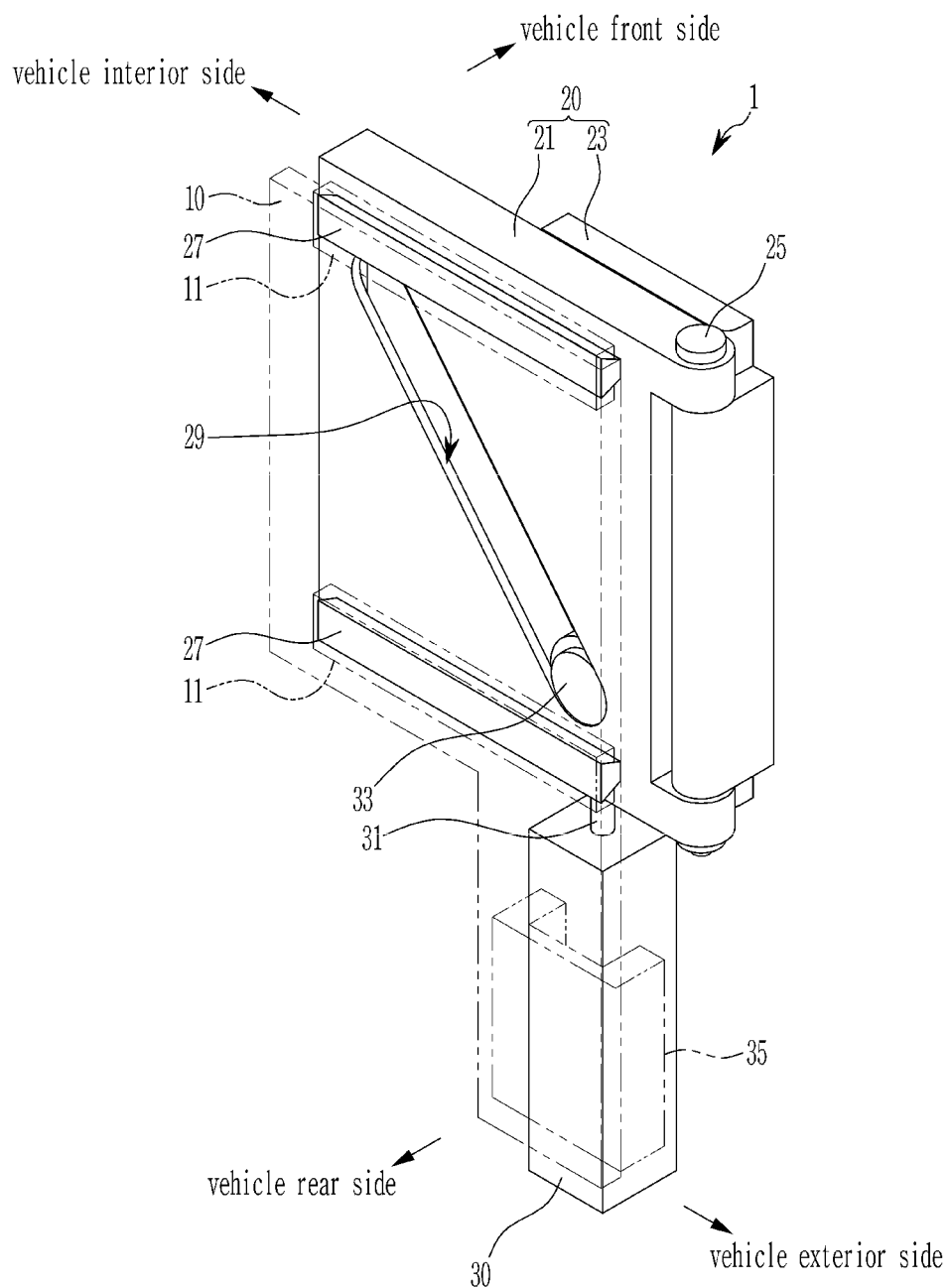
FIG. 6 is another perspective view of a door hinge apparatus of a vehicle according to various exemplary embodiments of the present invention, before operation.
Figure 7:
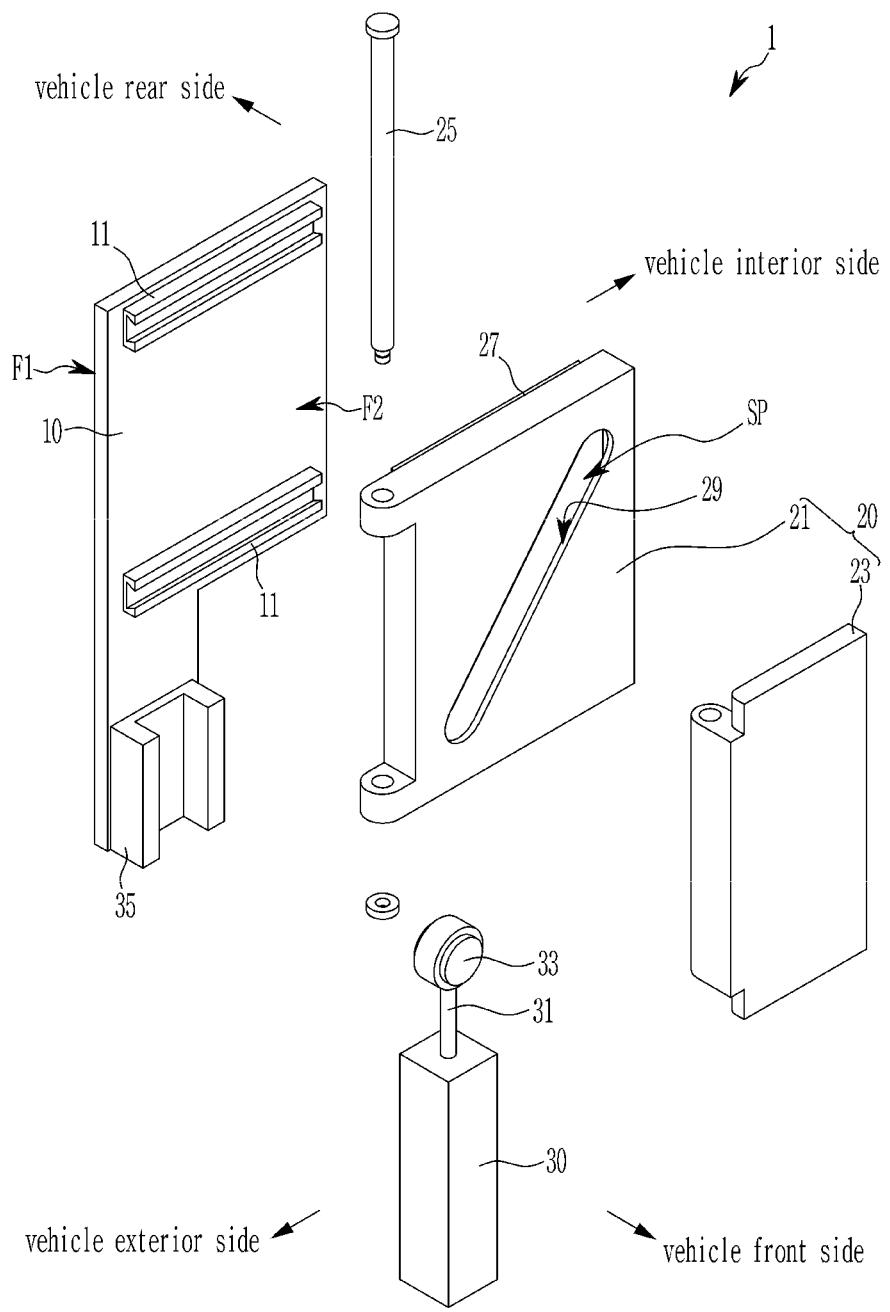
FIG. 7 is an exploded perspective view of a door hinge apparatus of a vehicle according to an exemplary embodiment of the present invention.

FIG. 5 is a perspective view of a door hinge apparatus of a vehicle according to various exemplary embodiments of the present invention, before operation, FIG. 6 is another perspective view of a door hinge apparatus of a vehicle according to various exemplary embodiments of the present invention, before operation, and FIG. 7 is an exploded perspective view of a door hinge apparatus of a vehicle according to an exemplary embodiment of the present invention.

It may be understood that, in FIG. 5, to show the installation position of a door hinge apparatus 1 according to various exemplary embodiments of the present invention, parts of vehicle body 3 and rear door DL are schematically indicated using dotted lines.

A door hinge apparatus of a vehicle according to various exemplary embodiments of the present invention may be applied to a rear door of a vehicle (e.g., a passenger vehicle) without a B-pillar. That is, the opening and closing operation of the rear door DL alone is enabled, by displacing the rear door DL rearward for the opening and closing operation to secure a rotation trajectory of the rear door DL to avoid interference with the front door front door.

Referring to FIG. 5 to FIG. 7, a door hinge apparatus 1 of a vehicle according to various exemplary embodiments of the present invention includes a rail plate 10, a hinge slide unit 20, and an actuator 30.

First, the rail plate 10 is fixed to the vehicle body 3 through a rear surface F1, and two rails 11 are configured on a front surface F2.

The two rails 11 may be formed in a width direction of the vehicle on upper and lower portions of the front surface F2. That the two rails 11 are formed in the width direction of the vehicle may not mean that the two rails 11 are strictly horizontal but may be formed to have horizontal dimension.

The rail plate 10 is provided on one side of the vehicle body 3 corresponding to a rear end portion of the rear door DL, through the rear surface F1. At the instant time, the vehicle body 3 may be a side external panel PL corresponding to the rear end portion of the rear door DL.

Furthermore, the rail plate 10 is provided on the side external panel PL such that the two rails 11 formed in the upper and lower portions are disposed from a vehicle front internal side of the vehicle body 3 toward a vehicle rear external side thereof.

Furthermore, the hinge slide unit 20 includes a slide bracket 21 and a door hinge bracket 23 that are interconnected by a hinge shaft 25, to be slidable along the rails 11 on the rail plate 10.

First, the slide bracket 21 internally forms a space portion SP having a lower portion opened, guide slots 29 are formed in a diagonal direction at both side surfaces of the space portion SP, to match with each other.

Here, each of the guide slots 29 at both the side surfaces of the slide bracket 21 are formed downward in the diagonal direction from the vehicle internal side of the vehicle body 3 toward the vehicle external side thereof.

Furthermore, the slide bracket 21 is provided such that the rear surface F1 may slide on the two rails 11 on the rail plate 10 through a slider 27.

At the present time, the two rails 11 are formed in the upper and lower portions of front surface of the rail plate 10, corresponding to the vehicle external side of the guide slot 29.

Furthermore, the door hinge bracket 23 is fixed to the rear end portion of the rear door DL, and is connected to an external end portion of the slide bracket 21 through the hinge shaft 25.

The slide bracket 21 of the hinge slide unit 20 may move the rear end portion of the rear door DL, along a rail 11 on the rail plate 10, toward the vehicle rear external side of the vehicle body 3, to secure the rotation trajectory of the rear door DL. In the instant state, the rear door DL may be opened or closed through the door hinge bracket 23, independently from the front door.

Furthermore, the actuator 30 provides a driving torque such that the slide bracket 21 slides in the width direction of the vehicle along the rail 11 while a roller 33 configured at a frontal end portion of a rod 31 rolls along the guide slot 29.

That is, the actuator 30 is provided under the rail plate 10 upwardly through a mounting bracket 35.

Furthermore, the rod 31 of the actuator 30 is disposed inside the space portion SP through an opening of the slide bracket 21, and the roller 33 in rolling contact with the guide slot 29 on both sides is rotatably connected to the frontal end portion of the rod 31.

Here, in various exemplary embodiments of the present invention, the actuator 30 may be formed as a cylinder-type linear motor provided with the roller 33 protruding at both sides of the frontal end portion of the rod 31, however, is not limited thereto. Any configuration may be applicable provided that the rod 31 may be moved forward and backward in a response to an opening/closing signal of the rear door DL such that the roller 33 moves along the guide slot 29 in the diagonal direction to force the slide bracket 21 to move along the rail 11.

In the actuator 30, by a forward (upward) operation of the rod 31, the roller 33 moves upward along the guide slot 29 to move the slide bracket 21 toward the vehicle external side of the vehicle body 3. By a backward (downward) operation of the rod 31, the roller 33 moves downward along the guide slot 29 to move the slide bracket 21 toward the vehicle internal side of the vehicle body 3.

Accordingly, while the rod 31 of the actuator 30 is moved forward and backward in a response to the opening/closing signal of the rear door DL, the slide bracket 21 together with the door hinge bracket 23 is slidably moved in the width direction of the vehicle such that a hinge point of the rear door DL is moved toward the vehicle rear external side of the vehicle body 3.

Hereinafter, an operation of a door hinge apparatus of a vehicle according to an exemplary embodiment of the present invention is described in detail with reference to FIG. 8, FIG. 9 and FIG. 10.

Figure 8:
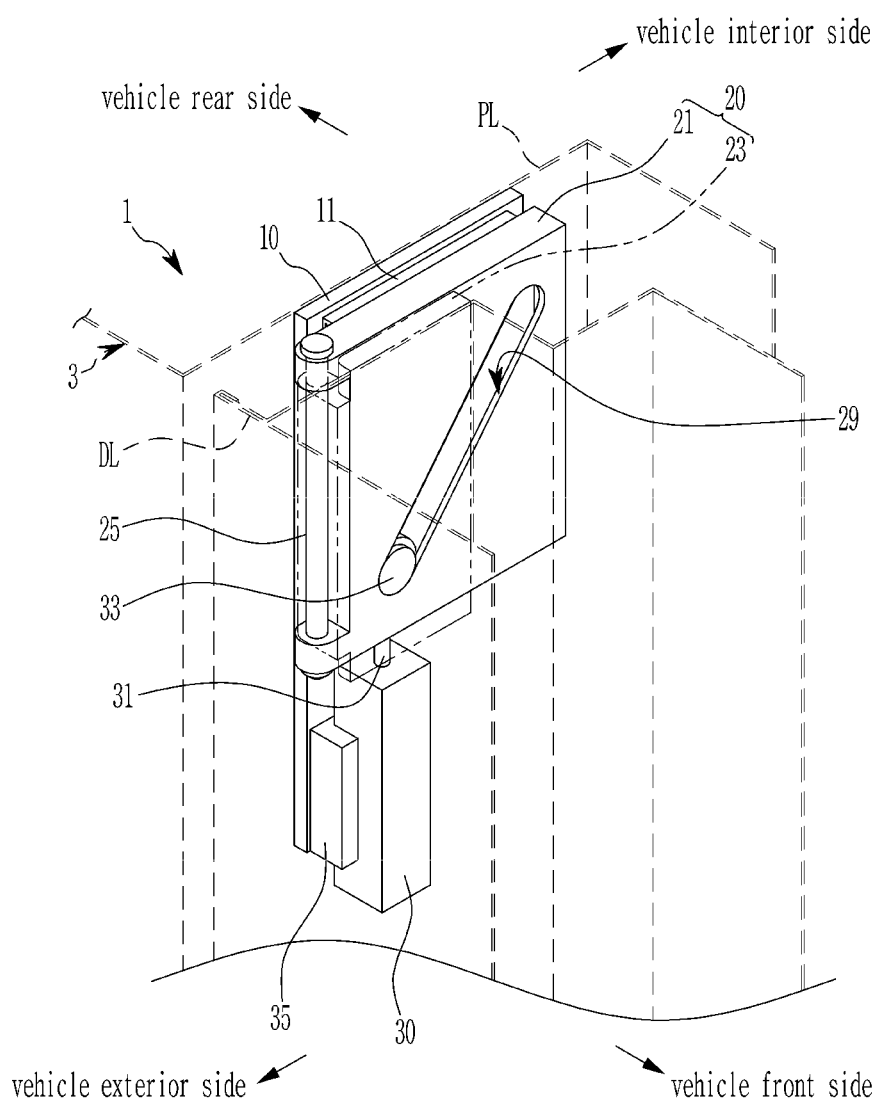
FIG. 8, FIG. 9 and FIG. 10 are perspective views in first, second, and third operation states of a door hinge apparatus of a vehicle according to an exemplary embodiment of the present invention.
Figure 9:
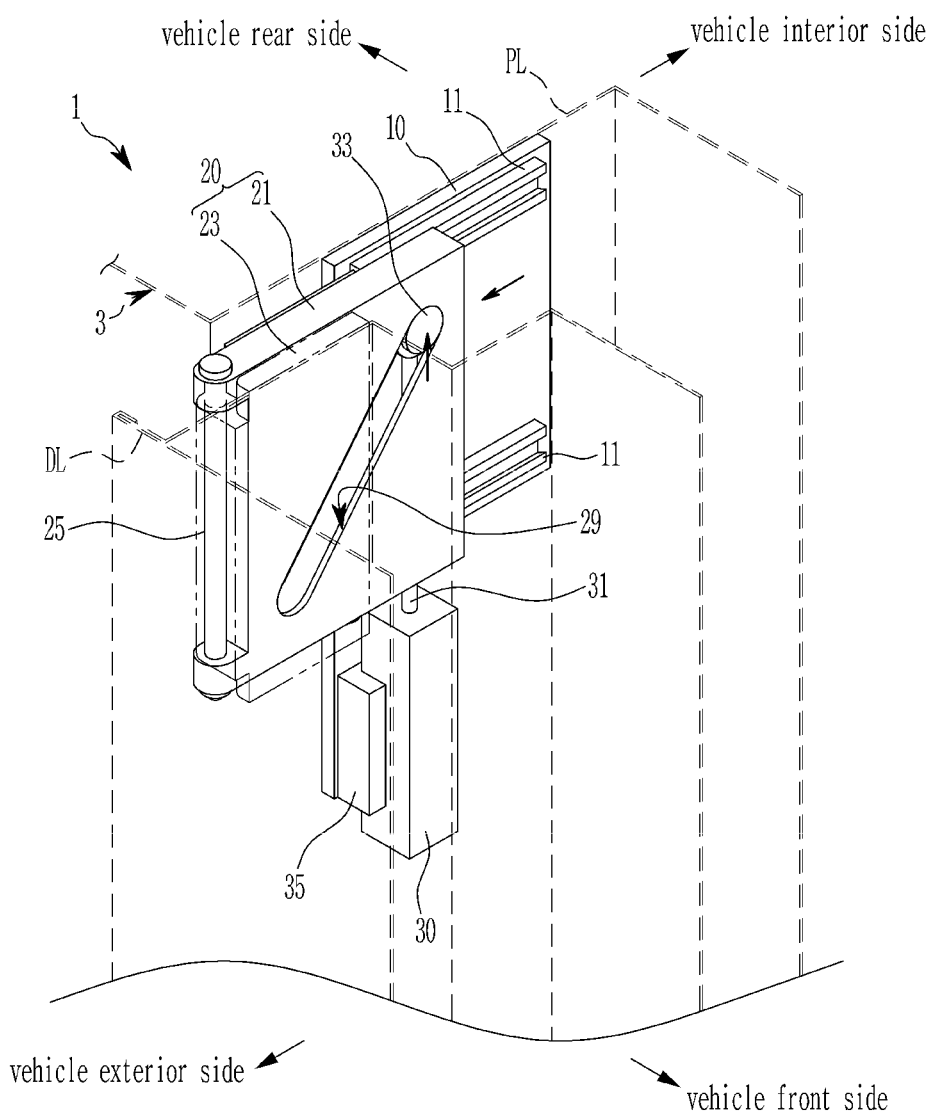
Figure 10:
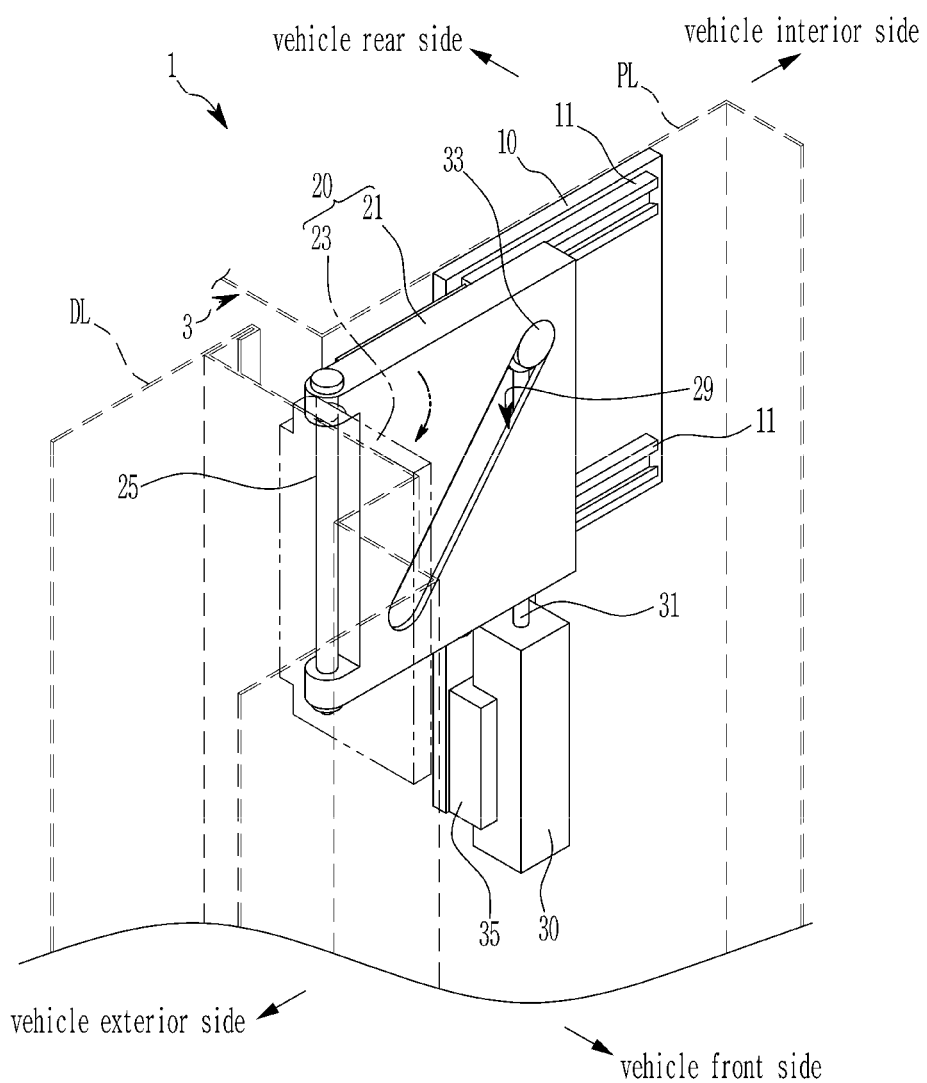

FIG. 8, FIG. 9 and FIG. 10 are perspective views in first, second, and third operation states of a door hinge apparatus of a vehicle according to an exemplary embodiment of the present invention.

In FIG. 8, FIG. 9 and FIG. 10, as in FIG. 5, to show the installation position of a door hinge apparatus 1 according to various exemplary embodiments of the present invention, parts of vehicle body 3 and rear door DL are schematically indicated using dotted lines.

First, referring to FIG. 8, as a first operation state, the rear door DL is in a closed state.

At the present time, the hinge slide unit 20 together with the rear end portion of the rear door DL is in a state having moved toward the vehicle front internal side of the vehicle body 3 along the rail 11 of the rail plate 10, and the rear door DL remains at the closed state.

Referring to FIG. 9, as a second operation state, to independently open the rear door DL, the actuator 30 is operated to move the rod 31 forward (upward).

Accordingly, the roller 33 configured at the frontal end portion of the rod 31 move upward while maintain the rolling contact with the guide slots 29. At the instant time, for the roller 33 move upward along the guide slot 29, the slide bracket 21 is pushed toward the vehicle external side in the width direction of the vehicle along the rail 11.

Accordingly, the slide bracket 21 of the hinge slide unit 20 moves toward the vehicle rear external side of the vehicle body 3 along the rail 11 on the rail plate 10 by the pushing force of the roller 33, and then the rear end portion of the rear door DL connected to the slide bracket 21 through the door hinge bracket 23 is moved toward the vehicle rear external side of the vehicle body 3, to secure the rotation trajectory of the rear door DL.

Referring to FIG. 10, thereafter, as a third operation state, when an occupant opens the rear door DL, the rear door DL is opened by rotating, together with the door hinge bracket 23, with respect to the slide bracket 21 around the hinge shaft 25.

Meanwhile, the closing operation of the rear door DL is performed in an opposite manner to the opening operation such that the opening and closing operation of the rear door DL may be performed independently from the front door, and the operation is not described in further detail.

Therefore, a door hinge apparatus 1 of a vehicle according to various exemplary embodiments of the present invention may be applied to the vehicle body 3 and the rear end portion of the rear door DL among opposite swing doors of a vehicle without a B-pillar, facilitating the opening and closing operation of the rear door DL independently from the front door.

That is, the roller 33 operated by the forward and backward operation of the actuator 30 forces the slide bracket 21 guided by the rail 11 on the rail plate 10 to slide from the vehicle front internal side of the vehicle body 3 toward the vehicle rear external side thereof.

Accordingly, in a process of opening of the rear door DL, the rear end portion of the rear door DL is pushed toward the vehicle rear external side in advance, to secure the rotation trajectory of the rear door DL without interference with other component parts, and in the instant state, the opening and closing operation of the rear door DL alone is enabled.

Accordingly, according to a door hinge apparatus 1 of a vehicle according to various exemplary embodiments of the present invention, in opposite swing doors of a vehicle without a B-pillar, while maintaining the merit of good open feeling when the passengers get on/off or in leisure activities, the rotation trajectory of the rear door DL may be secured when the rear door DL is opened and closed, and thereby the door opening and closing sequence is not limited.

Furthermore, a door hinge apparatus 1 of a vehicle according to an exemplary embodiment of the present invention is slimmer than a conventional gooseneck-type hinge device, and also has an advantage in vehicle body layout configuration because it does not require an extra free space for rear door operation.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A door hinge apparatus of a vehicle, the door hinge apparatus comprising:
   a rail plate provided on one side of a vehicle body corresponding to an end portion of a door of the vehicle and formed with a rail in a width direction of the vehicle;
   a hinge slide unit including a slide bracket provided on the rail and a door hinge bracket provided on the door, wherein the slide bracket includes a guide slot formed in a diagonal direction of the slide bracket and the slide bracket and the door hinge bracket are pivotally coupled to each other through a hinge shaft; and
   an actuator including a rod coupled to the guide slot to move along the guide slot so that the slide bracket moves along the rail.

2. The door hinge apparatus of claim 1, wherein the actuator includes a roller rotatably mounted on an end of the rod to roll along the guide slot.

3. The door hinge apparatus of claim 2, wherein the end portion of the door is a rear end portion of a rear door.

4. The door hinge apparatus of claim 3, wherein the rail plate is provided on a side external panel corresponding to the rear end portion of the rear door and the rail is disposed from a vehicle front internal side of the vehicle body toward a vehicle rear external side thereof.

5. The door hinge apparatus of claim 1,
   wherein the slide bracket of the hinge slide unit includes a space portion having a lower portion opened to accommodate the rod therein, includes the guide slot in the diagonal direction at first and second side surfaces of the side bracket, and is configured to move along the rail through a slider of the slide bracket, the slider being slidably coupled to the rail.

6. The door hinge apparatus of claim 5,
   wherein the door hinge bracket of the hinge slide unit is fixed to the end portion of the door, and connected to an external end portion of the slide bracket through the hinge shaft.

7. The door hinge apparatus of claim 5, wherein the guide slot is formed at first and second side surfaces of the slide bracket downwardly in the diagonal direction from a vehicle internal side of the vehicle body toward a vehicle external side thereof.

8. The door hinge apparatus of claim 1, wherein the rail is respectively formed at upper and lower portions of the rail plate corresponding to a vehicle external side of the guide slot.

9. The door hinge apparatus of claim 1, wherein the actuator includes a linear motor provided with a roller at a frontal end portion of the rod.

10. The door hinge apparatus of claim 9,
wherein the actuator is provided under the rail plate upwardly and mounted on a mounting bracket;
wherein the rod of the actuator is disposed inside a space portion; and
wherein the roller is rotatably connected to the frontal end portion of the rod and in rolling contact with the guide slot.

\* \* \* \* \*